Sept. 9, 1969  L. HRUSOVSKY  3,466,202

METHOD OF MAKING WEAR RESISTANT SPRING LEAF

Filed July 21, 1966

INVENTOR
LOUIS HRUSOVSKY

BY Strauch Nolan Neale Nies & Bronaugh
ATTORNEYS

United States Patent Office 3,466,202
Patented Sept. 9, 1969

3,466,202
METHOD OF MAKING WEAR RESISTANT SPRING LEAF
Louis Hrusovsky, Bloomfield Hills, Mich., assignor to North American Rockwell Corporation, a corporation of Delaware
Filed July 21, 1966, Ser. No. 566,968
Int. Cl. C21d 7/14
U.S. Cl. 148—149                              4 Claims

ABSTRACT OF THE DISCLOSURE

A method of making a wear resistant spring leaf comprises the steps of providing an elongated steel spring leaf having desirable spring characteristics including moderate hardness, use of said spring leaf in a suspension subjecting localized surface regions extending across the width of one side of said spring leaf adjacent its ends to sliding engagement with frame mounted wear surfaces, and hardening central limited width portions only of said localized surface regions to a limited predetermined depth to provide surface wear resistance without adversely affecting the desirable spring characteristics in the remainder of said spring leaf including the edge portions of said surface regions.

---

This invention refers to leaf springs for vehicle suspensions and more particularly to leaf springs of increased wear resistance at their slidingly mounted ends and an improved method of making spring leaves.

This is accomplished in the invention by controllably hardening by heat treating localized areas of the otherwise finished leaf spring which are subject to sliding, abrasive and like wear.

In vehicle leaf spring suspensions of the cantilever supported type, that is, in which the ends of the leaf spring are slidingly mounted in frame brackets, a constant source of difficulty is that abrasive wear occurs between the leaf spring ends and the associated bracket surfaces, often resulting in premature failure. Although efforts have been made to counteract this difficulty by installation of hardened wear plates or buttons in the spring brackets such did not eliminate the wear effect on the leaf spring ends themselves. This steady wear at the spring ends caused by sliding and rebound on the associated wear surfaces of the spring brackets gradually destroys the surface of the leaf spring and impairs the metal structure often causing undesirably rapid failure in normal operation.

The invention provides a method of locally increasing the initial hardness of a previously heat treated and tempered leaf spring at areas subject to abrasive wear by heat hardening only these particular surface areas to a desired depth rapidly so that the adjoining areas will not be affected by the hardening. It is not desired to deep or through harden these wear areas of the leaf spring since in that case undesired tensile stresses will be built up in the longitudinal cross-section of the leaf where the higher hardness material changes to the lower hardness material which would cause early failure at these points. It is not desirable to harden the entire spring because that would adversely change the spring characteristics.

The invention also provides novel means to locally harden selected areas of a spring leaf to a desired depth (preferably not more than one-third of the cross-section of the spring leaf) without detrimentally affecting the remainder of the spring leaf. This is accomplished by intensely heating the selected area speedily at a fixed rate and accompanied by controlled chilling to localize the heated zone.

The invention also includes the novel leak spring structure attained thereby.

It is a major object of the invention to provide a novel leaf spring of improved wear resistance wherein localized zones of the spring are hardened without changing the spring characteristics, and the novel method of making this spring leaf.

Another object of the invention is to provide a novel wear resistant leaf spring wherein localized zones of controlled depth with respect to spring surfaces subject to sliding wear are hardened as by induction heating with the heated zone controlled in extent by associated chilling.

It is a further object of the invention to provide a novel tempered spring leaf having localized areas adjacent its ends appreciably hardened to a controlled depth, preferably for about one-third the spring thickness.

The invention will be better understood by reference to the following detailed description in connection with the appended drawings forming part thereof and in which.

Figure 1:
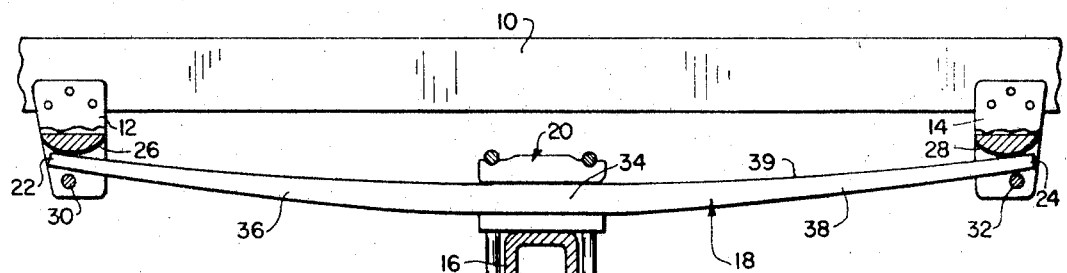
FIGURE 1 is a side elevation partly in section showing a vehicle leaf spring suspension in which the invention is advantageously employed.

FIGURE 1 shows a representative vehicle suspension arrangement comprising a vehicle longitudinal side frame member 10 from which depend rigid spaced hanger brackets 12 and 14. Suspended beneath frame 10 is a transverse axle 16 which is resiliently connected to the frame at each side by a leaf spring 18 fixedly attached to the axle as by a bolster plate and U-clamp assembly 20. The ends 22 and 24 of each leaf spring 18 are in sliding support contact with wear plates 26 and 28 within brackets 12 and 14 to thus operatively connect the axle 16 with vehicle frame 10. Rebound movement of the leaf spring ends is limited by pins 30 and 32 fixed in brackets 12 and 14 a small distance below the wear plates 26 and 28.

Leaf spring 18, which may be a single leaf or the longest leaf in a multileaf assembly, is made of spring steel usually employed in making leaf springs, such as chromium or chromium-molybdenum steel. Preferred steels are the chromium-molybdenum steel in the AISI 4100 group and the chromium steel in the AISI 5100 group, as well as the carbon steel in the AISI 1040–1045 group. In the present instance the leaf spring 18 may be a single tapered leaf spring produced according to the method disclosed in United States Patent No. 3,238,072 to R. R. Greene et al. This method includes such steps as taper rolling and grinding the tension side of the leaf as well as stress peening and proper heat treatment including tempering to provide a high quality spring leaf having a central portion 34 of maximum thickness from which extend tapered portions 36 and 38 of gradually decreasing thickness towards both ends. The invention is however, applicable to any leaf spring.

Although stress peening of the tension side 39 of the leaf spring as disclosed in the above noted United States patent considerably improves the tension surface quality of the leaf spring by introducing beneficial residual compressive stresses, it does not materially increase the wear resistance of the tension surface.

The usual chromium-molybdenum steel leaf spring so made is tempered to relieve stress concentrations set up during the working steps. This tempering produces a relatively uniform hardness of about 40 to 45 Rockwell C scale throughout the finished spring. This hardness is generally found to be optimum for a vehicle leaf spring for obtaining the desired spring rate and elasticity and it desirably should be retained as much as possible. However, a greater hardness is required to materially reduce the abrasive wear at the spring ends. It would be highly detrimental to the quality and temper of the spring leaf to merely provide a higher uniform hardness throughout the leaf. The invention provides the required hardness at the wear areas without adversely affecting the spring quality.

Figure 2:
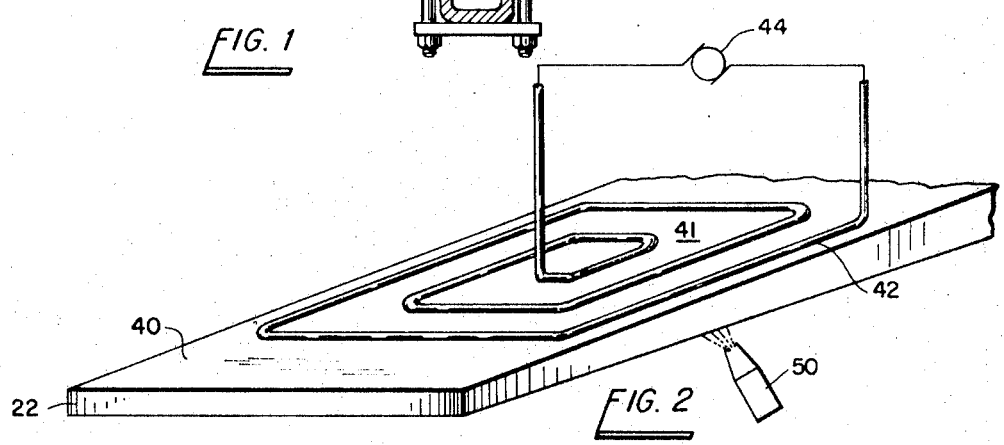
FIGURE 2 is an enlarged fragmentary view that shows one form of a heating and quenching method and apparatus applied to an end of the spring leaf.
Figure 3:
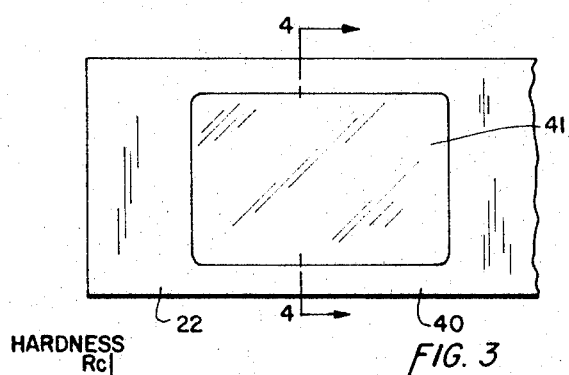
FIGURE 3 is a plan view of the heat treated leaf spring end of FIGURE 2 showing the approximate hardened wear area produced by the invention.

This is preferably accomplished in the present invention in the following manner: FIGURE 2 shows the spring leaf end 22 wherein the upper surface region at 40 which is in sliding rocking metal to metal contact with bracket wear plate 26 is subject to wear. To increase the hardness at this region a defined surface area 41 is locally heated as by the means of a shaped induction heating coil 42 of proper size at a predetermined rate to a temperature sufficient to obtain the desired hardness, and immediately quenched. As shown in FIGURE 3, hardened area 41 extends only across a limited width portion of the surface region 40 between relatively non-hardened edge portions. The heating rate, that is, the time duration and power of the induction coil, is selected such that through hardening of the leaf spring end is prevented. In practice, the time and area subjected to heating are such that the metal is heated only through to a controlled depth of the total thickness of the spring leaf down from surface 40 at area 41, preferably for about one-third of that thickness.

In a representative example, the spring leaf 18 may be placed on a traversing fixture (not shown) and scanned beneath a contour semicoaxial induction coil 42 in the form of a pancake coil comprising a plurality of spiral turns of copper tubing which may also contain the usual cooling fluid. The terminals of the coil are connected in the output circuit of a high frequency power source 44 as by conductors 46 and 48. The power input in a working embodiment is about 50 kilowatts at 10,000 cycles and the scanning rate with which a chrome steel spring end 22 was moved beneath the coil 42 was ½ inch per second to quickly heat the wear area 41 to the desired depth. The power input and scanning rate can of course be varied to suit any particular size of leaf spring. The shape of the coil shown in the drawing as being rectangular may also be varied as to round, oval or other shapes depending on the desired area 41 to be heated.

Chilling control can be accomplished in any known manner such as by heat sink of the back-up material, or by a water spray directed on the nonheated underside of the spring leaf during scanning as indicated at 50 in FIGURE 2. By chilling the opposite side of the leaf with the spray 50 during the heating step, effective isolation of the hardening heat to zone 52 is accomplished. This method is preferable in that it prevents a material drawing effect, that is, an appreciable decrease in original hardness of the tempered spring below that of the intentionally hardened zone.

Figure 4:
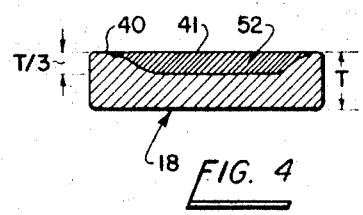
FIGURE 4 is a cross-section substantially on line 4—4 of FIGURE 3 through the hardened wear zone of the leaf spring end.

FIGURE 4 which is a random transverse cross-section through the hardened wear area 41 illustrates the depth penetration of the heating effect and the depth of the hardened zone 52 in accord with the present novel method. The hardened zone, as shown, penetrates to about one-third of the total thickness T of the leaf, which has been found to be sufficient in most cases and desirable in order to generate beneficial residual compressive stresses on the surface that aid in reducing fretting corrosion. Hardening to a depth deeper than about one-third or through hardening would produce deleterious residual tensile stresses on the surface, which, of course, is undesired.

While spring 18 is disclosed herein as hardened on the tension side, the invention is not so limited and includes the hardening of the spring at any side where subject to wear. Further, while the hardening is preferably done after grinding the tension side, such is not essential and the hardening may take place at any time near the end of the spring making process.

Microscopic examination of the hardened zone 52 reveals that the original microstructure of the tempered spring leaf which was martensite was transformed in the hardened zone 52 to a martensitic micro-structure consisting of martensite, bainite and ferrite with a decarburized upper surface. The subsurface of the hardened zone consists largely of martensite with a trace of bainite. The decarb characteristic on the surface may vary slightly in accordance with the manufacturing methods employed. This, however, is of no influence on the result obtained by the present invention.

It has been found that a desired hardness range for the hardened wear area 41 lies between about 60 to 65 Rockwell C which has been found to produce a wear resistance about eight times better than the wear resistance of the original 40 to 45 Rc hardness of the spring leaf at that area.

Figure 5:
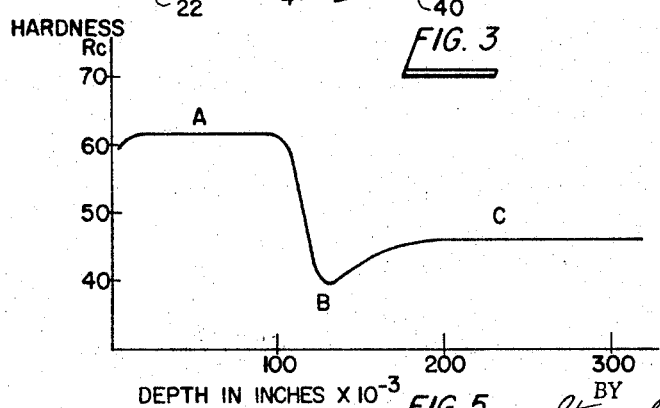
FIGURE 5 is a graphic presentation showing hardness variations produced in the spring end by the invention.

As indicated in the graph in FIGURE 5 which was constructed by making actual hardness measurements in a sample leaf spring treated according to the invention along a vertical axis through the wear zone area, it can be seen that the curve portion A for the hardened zone 52 shows a substantiallly uniform hardness obtained throughout at better than 60 Rockwell C which at the end of the hardened zone abruptly falls off at B to somewhat below that of the original hardness of from 40 to 50 Rc of the main portion C of the spring leaf. This represents a zone 52 having a hardness about 50% greater than the rest of the spring leaf. The drop in hardness at B immediately below the hardened zone is caused, as mentioned before, by the drawing effect during heating. However, this is negligible and can be mainly prevented by directing a stream of cooling water on the underside of the leaf spring as shown in FIGURE 2. A stress measurement taken at a depth of 0.010 inch below the surface in the hardened area revealed a beneficial residual compressive stress of 119 KSI.

Thus, the invention provides a novel method of effectively hardening one or more selected localized areas of a leaf spring to a desired depth to form a substantially uniform hardness zone of controlled depth at that area without detrimentally affecting the remainder of the leaf spring, so that wear resistance at this area will be substantially increased and the useful spring life lengthened.

While the spring 18 has its hardened wear areas at upper surfaces, the invention of course is equally applicable to springs which have their ends supported from below on wear surfaces, such as the springs disclosed in Bixby Patent No. 2,999,695.

The present invention may be embodied in other forms without departing from the spirit and essential characteristic thereof, therefore, the present embodiments are to be considered as illustrative only and not restrictive, the scope of the invention being indicated by the appended claims rather than by the foregoing description.

I claim:
1. In a method of producing an elongated wear resistant steel vehicle spring leaf having on one side localized bearing surface regions at the spring ends thereof adapted for sliding bearing engagement, the improvement comprising heating said localized bearing surface regions in selected central limited width portions to a hardening temperature and subsequently quenching to effect a hardening zone of limited depth up to about one-third of the total spring leaf thickness.

2. The method defined in claim 1, wherein said hardening is accomplished by induction heating at said regions.

3. The method defined in claim 2, wherein the depth of hardening is controlled by associated chilling of the leaf adjacent said regions.

4. The method defined in claim 1, wherein said spring leaf is a tempered spring leaf having a uniform hardness of 40–45 Rockwell C, and said regions have a hardness of 60–64 Rockwell C and extend to a depth of about one-third the thickness of the leaf.

References Cited
UNITED STATES PATENTS

| | | | |
|---|---|---|---|
| 2,294,161 | 8/1942 | Crowe | 148—145 |
| 2,831,788 | 4/1958 | Bridge et al. | 148—150 |
| 2,935,433 | 5/1960 | Pribyl | 148—152 |
| 3,173,668 | 3/1965 | Giovinazzo | 267—56 |
| 3,233,915 | 2/1966 | Hamlet | 267—56 |
| 3,240,639 | 3/1966 | Lihl | 148—39 |

CHARLES N. LOVELL, Primary Examiner

U.S. Cl. X.R.

148—150, 152